(12) United States Patent
Yseboodt et al.

(10) Patent No.: US 11,095,465 B2
(45) Date of Patent: Aug. 17, 2021

(54) CONTROL OF POWER DELIVERY TO A DC-POWERED DEVICE

(71) Applicant: SIGNIFY HOLDING B.V., Eindhoven (NL)

(72) Inventors: Lennart Yseboodt, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/761,886

(22) PCT Filed: Nov. 12, 2018

(86) PCT No.: PCT/EP2018/080854
§ 371 (c)(1),
(2) Date: May 6, 2020

(87) PCT Pub. No.: WO2019/092227
PCT Pub. Date: May 16, 2019

(65) Prior Publication Data
US 2020/0313912 A1    Oct. 1, 2020

(30) Foreign Application Priority Data

Nov. 13, 2017 (EP) .................................... 17201295

(51) Int. Cl.
*H04L 12/10* (2006.01)
(52) U.S. Cl.
CPC .................................. *H04L 12/10* (2013.01)

(58) Field of Classification Search
CPC .................................. H04L 12/10; G06F 1/26
See application file for complete search history.

(56) References Cited

U.S. PATENT DOCUMENTS

| | | | |
|---|---|---|---|
| 7,973,538 B2* | 7/2011 | Karam | H04L 12/10 |
| | | | 324/539 |
| 9,859,951 B2* | 1/2018 | Heath | H04L 12/10 |
| 2006/0056258 A1 | 3/2006 | Eto | |

(Continued)

FOREIGN PATENT DOCUMENTS

| | | |
|---|---|---|
| JP | 2008529461 A | 7/2008 |
| JP | 2016535892 A | 11/2016 |
| WO | 2016149549 A1 | 9/2016 |

(Continued)

*Primary Examiner* — Ryan Johnson

(57) ABSTRACT

A DC-powered device controller (101), comprising a DC-power unit (102) configured to be electrically connected via a wired power line (105) to an external DC-power supply device (104), a control unit (112) connected with the DC-power unit and configured to receive from a DC-voltage monitoring unit (108) response signals indicative of a current voltage amount of the DC-power and to receive, from a mark-event timer unit (110), an extended-mark-time signal when a measured mark-event time exceeds a predetermined mark-event duration threshold, and to enable delivery of the currently received DC-power to an external electrical load unit (106) in event of either one of a) detecting that the current response signal is indicative of the currently received voltage amount falling into an operating voltage interval, and b) detecting that the extended-mark-time signal has been received.

14 Claims, 7 Drawing Sheets

(56) References Cited

U.S. PATENT DOCUMENTS

2015/0042243 A1* 2/2015 Picard .................... H04L 12/10
　　　　　　　　　　　　　　　　　　　　　315/307
2015/0200540 A1　7/2015 Draaijer et al.

FOREIGN PATENT DOCUMENTS

| WO | 2016184661 A1 | 11/2016 |
| WO | 2017001179 A1 | 1/2017 |
| WO | 2017017546 A2 | 2/2017 |

* cited by examiner

CONTROL OF POWER DELIVERY TO A DC-POWERED DEVICE

FIELD OF THE INVENTION

The present invention relates to a power controller for a DC-powered device, herein also referred to as a DC-powered-device controller, to a DC-powered device, to an electrical arrangement, and to a method for operating a DC-powered-device controller.

BACKGROUND OF THE INVENTION

WO 2017/001179 describes a power providing device, a power receiving device and a corresponding method of providing power from a power providing device to multiple power receiving devices allowing for a reduction of the power consumed in stand-by situations, thus providing a distribution system that allows for a provision of standby assistance low voltage which allows for increased efficiency operation.

SUMMARY OF THE INVENTION

It is an object of the invention to improve the provision of standby power to a DC-powered device.

According to a first aspect of the present invention a DC-powered-device controller is presented. The DC-powered-device controller comprises:

a DC-power unit configured to be electrically connected to an external DC-power supply device to receive electrical DC-power of different power amounts therefrom;

a DC-voltage monitoring unit configured to monitor a currently received voltage amount of the received DC-power, and to output a respective response signal indicative of the currently received voltage amount falling into a respective one of a number of predetermined non-overlapping voltage intervals including a mark-event-voltage interval and an operating voltage interval, wherein voltage amounts of the mark-event voltage interval are lower than those of the operating-voltage interval;

a mark-event timer unit configured to receive the currently received response signal and to start a mark-event time measurement upon detecting that the currently received response signal indicates that the voltage amount of the currently received DC-power has made a transition into the mark-event voltage interval, and to provide an extended-mark-time signal upon detecting that a measured mark-event time since the start of the mark-event time measurement exceeds a predetermined mark-event duration threshold;

a control unit connected with the DC-power unit and configured to receive the current response signal and the extended-mark-time signal, and configured to enable delivery of the currently received DC-power to an electrical load unit in event of either one of:

a) detecting that the current response signal is indicative of the currently received voltage amount falling into the operating voltage interval, and b) detecting that the extended-mark-time signal has been received.

The invention is based on the recognition that DC-power supply devices are known which detect if a suitable DC-powered device is connected via a wired power line to avoid delivering power to an unsuitable DC-powered device or to provide power to an unconnected power interface, which implies a risk of electrocution.

Further, upon detecting a suitable DC-powered device connected via the wired power line the DC-power supply is configured to perform a classification procedure aiming at determining the amount of power that the DC-power device requires. This is performed by the DC-powered device by providing DC-power to the DC-power device that is lower than an operational DC-power. Only when the classification procedure has finished, the DC-power supply is configured to provide the operational power to drive operation of the light sources.

The DC-powered-device controller of the first aspect of the invention is advantageously configured to expand the operational capabilities of a suitable external electrical load unit beyond those based on provision of DC-power having a voltage amount falling into the operating voltage interval. The DC-powered-device controller comprises a control unit that is configured to enable delivery of currently received DC-power to the external electrical load unit in two cases.

In the first case the control unit enables the delivery of the currently received DC-power when the voltage amount of the currently received DC-power falls into the operating voltage interval. The DC-voltage monitoring unit monitors the currently received voltage amount and when the currently received voltage falls into a predetermined operating voltage interval, the DC-voltage monitoring unit outputs a response signal indicative thereof. In this first case this response signal is also referred to as the operating response signal. The operating response signal is received by the control unit. Its reception at the control unit triggers the delivery of the currently received DC-power, which in this case is DC-power having a voltage amount within the operational voltage interval, to the external electrical load unit.

Additionally, however, the control unit also enables the delivery of DC-power to the external electrical load unit in a second case. To this end, the DC-voltage monitoring unit is additionally configured to provide a response signal indicative of the currently received voltage amount falling into a mark-event-voltage interval. The response signal in this second case is referred to also as the mark-event-response signal. The mark-event-voltage interval and the operating-voltage interval are non-overlapping, and voltage amounts of the mark-event voltage interval are lower than those of the operating-voltage interval.

The present invention recognizes that such a power amount associated with a voltage amount lower than the operating voltage interval is often very limited in time because it is delivered for purposes other than providing power for operation. The present invention conceives that such low power can still be used to drive at least limited operation of an external electrical load unit under suitable circumstances. In particular, the invention recognizes that in view of characteristics of external DC-power supply devices providing such DC power using different voltage amounts, a threshold duration of availability of such DC power associated with the lower voltage amount is a suitable criterion for enabling use of this lower-voltage power amount for driving operation or limited operation. Suitable circumstances fulfilling the threshold duration of availability are herein referred to as extended mark events.

The power controller of the present invention therefore comprises a mark-event timer unit that makes a mark-event time measurement upon detecting that the currently received response signal indicates that the voltage amount of the currently received DC-power has made a transition into the mark-event voltage interval, and to provide an extended-mark-time signal upon detecting that a measured mark-event time since the start of the mark-event time measurement exceeds a predetermined mark-event duration threshold.

The reception of the extended-mark-time signal by the control unit triggers the delivery of the currently received DC-power, which in this case DC-power having a voltage amount within the mark-event-voltage interval to the electrical load unit.

This way, a delivery of a currently available DC power amount with a voltage amount lower than the operating voltage is enabled in case this lower power amount has been available for a certain time span, the mark-event duration threshold. The power controller of the present invention thus enables a provision of DC-power with a lower voltage for enabling at least limited operation under suitable circumstances, which heretofore could not be used for driving operation of an electrical load unit.

In the following, embodiments of the first aspect of the present invention will be presented.

In preferred embodiments of the DC-powered-device controller of the first aspect, the predetermined mark-event duration threshold amounts to at least 400 milliseconds. This threshold value forms a suitable limit to distinguish between DC-power supply devices being able to implement the extended mark event from those that do not. In one embodiment the mark-event duration threshold amounts to exactly 400 milliseconds.

The DC-powered-device controller is in some embodiments implemented as a stand-alone module having interfaces for power reception and control data exchange with an external DC-power supply device, and for power delivery to an external electrical load device.

In other embodiments, which at the same time form a second aspect of the present invention, a DC-powered device comprises a DC-powered-device controller according to the first aspect of the present invention or one of its embodiments, and an electrical load unit. The electrical load unit is configured to operate in a first operating mode upon delivery of the DC-power with a voltage amount falling in the operating voltage interval, and to operate in a second operating mode requiring less DC-power than the first operating mode, upon delivery of the DC power with a voltage amount falling in the mark-event voltage interval.

In the DC-powered device of the second aspect, the control unit of the DC-powered-device controller is configured to enable the first operating mode upon detecting that the current response signal is indicative of the currently received voltage amount falling into the operating voltage interval, and to enable the second operating mode upon detecting that the extended-mark-time signal has been received.

The following description turns to embodiments of the DC-powered device.

The electrical load unit suitably comprises a load device for performing a predetermined functional operation in the first operating mode, under an operating voltage in the operating voltage interval. The load unit is for instance a controllable lighting unit comprising a load device in the form of a lighting device comprising LEDs and an LED driver. The lighting unit further comprises a processor for controlling operation the lighting device and a control transceiver for exchanging control communication. In the second operating mode, under power delivery with a voltage in the mark-event voltage interval, the load device performs limited functionality. In the mentioned example of the lighting unit, this new form of power delivery can be used for providing power for maintaining operation of the processor and the control transceiver, while the LED driver and the LEDs are turned off.

In yet other embodiments, the electrical load unit comprises at least two electrical load devices being operable in either the first operating mode or the second operating mode.

Some advantageous DC-powered devices have the control unit arranged between the DC-power unit and the electrical load unit, and the control unit comprises:
- a controllable hotswap switch for enabling, in a closed state, or disabling, in an open state, the delivery of the currently received DC-power from the DC power unit to the electrical load unit;
- a controllable current source unit arranged between the DC-power unit and the hotswap switch and configured to generate and provide electrical current of a controllable current amount to the external DC-power supply device; wherein the DC-voltage monitoring unit (108) is configured to output the following response signals:
  a mark-event response signal indicative of the currently received voltage falling in the mark-event-voltage interval,
  a class-event response signal indicative of the currently received voltage falling in a class-event voltage interval, wherein voltage amounts of the class-event voltage interval are lower than those of the operating-voltage interval but higher than those of the mark-event voltage interval; and the control unit is configured, while the controllable hotswap switch is in the open state, to
  count, with reference to a detected predetermined reset event, a number of received class-event response signals, and to control, in response to receiving a respective class-event response signal, the electrical current to be generated by the controllable current source unit to assume one of a number of predetermined class-current amounts in dependence on the momentaneous count of received class-event response signals and of a stored device type identifier allocated to the DC-powered device; and
  to control the amount of current generated by the controllable current source in response to a received mark-event response signal to assume a predetermined mark-event current amount.

These embodiments are particularly advantageous for enabling a classification procedure between the external DC-power supply device and the DC-powered device using the class-event and mark-event response signals to the currently received voltage amounts. Such classification procedures are for instance known from the well-known Power-over-Ethernet standard. Power over Ethernet has a concept of 'mutual identification'. This means that a DC power-supply device (PSE) can figure out what kind of DC-powered device (PD) is connected, and, likewise, a DC-powered device can find out what kind of DC power supply device it is connected to. Distinctions can be made regarding 'Type' of the PSE or PD and the 'Class' of the PSE or PD. Type is a container for certain capabilities and common specifications. That includes, but is not limited to, a certain power range capability. For a PSE, the Class is the amount of power the PSE has reserved for the PD. For a PD, the Class is the amount of power the PD wishes to receive. The PSE makes the decision of what class will be used; this may be equal, or lower, to the class the PD has requested. If in a system where a PSE and PD are connected, both know the Type and Class of the other, it is said that mutual identification is established.

The DC-powered device is thus preferably configured to request, depending on a stored device type identifier allocated thereto, a given amount of DC-power for the first operating mode that depends on power requirements of the electrical load unit. The DC-powered device informs the DC-power supply about this requirement by responding in a predetermined manner to currently received voltage amounts falling into the class-event voltage interval, in what it is referred to here as a class event. Two consecutive class events are separated by the currently received voltage amount falling into a mark-event voltage interval, which is referred herewith as a mark-event. Both of these situations are detected by the DC-voltage monitoring unit which outputs a mark-event response signal indicative of the currently received voltage falling in the mark-event-voltage interval, thus forming a mark-event, and a class-event response signal indicative of the currently received voltage falling in a class-event voltage interval, thus forming a class-event. Voltage amounts of the class-event voltage interval are lower than those of the operating-voltage interval but higher than those of the mark-event voltage interval.

The control unit is configured to count, based on the response signals provided by the DC-voltage monitoring unit, and with reference to a detected predetermined reset event, a number of received class-events response signals, i.e., the number of class-events since the latest detected predetermined event. The detected predetermined reset event may comprise one of a plurality of reset events. Reset events may include detecting that the currently received voltage amount falls into a reset-voltage interval or detecting that the currently received voltage amount falls into the operating voltage interval. This is to ensure that the control unit does not indefinitely count and that the counting process can be controllably reset.

The control unit preferably also controls, in response to receiving a respective class-event response signal, an electrical current to be generated by a controllable current source unit to assume one of a number of predetermined class-current amounts in dependence on the momentaneous count of received class-event response signals and of a stored device type identifier allocated to the DC-powered device. Therefore the control unit, depending on the added number of class-events detected since the latest reset event and on the stored device type identifier indicative of the power requirements, is configured to drive a controllable current source to assume a predetermined class-current amount, and thus to provide a suitable DC-power supply device with information pertaining to the DC-power requirements of the electrical load unit.

The control unit preferably also controls the controllable current source during mark-events. In these cases, the controllable current source generates a predetermined mark-event current amount.

The controllable current source of this embodiment is suitably arranged between the DC-power unit and a hotswap switch that is controllable by the control unit for enabling, in a closed state, or disabling, in an open state, the delivery of the currently received DC-power from the DC power unit to the electrical load unit.

The control unit of this embodiment counts the number of class-events only when the controllable hotswap switch is in the open state, i.e. when the delivery of DC-power is disabled. The mark-event current amount and the predetermined class-current amounts are suitably implemented as falling into a predetermined mark-event current interval and class-current amount interval, respectively. These class-current amount intervals are non-overlapping.

These embodiments thus advantageously provide a capability for switching the provision of DC-power to the electrical load unit between the second operating mode, which requires less DC-power, and the first operating mode.

Preferred embodiments of the DC-powered device are configured to adhere to the IEEE 802.3 standard (Power over Ethernet). This standard provides a suitable protocol for use in exchanging information pertaining to power requirements between a DC-power supply device and a DC-powered device. A particularly suitable modification of such protocol is included in the IEEE 802.3bt standard version and makes use of an extended mark period. Under this standard version, the DC-power supply device is allowed to wait in a mark condition, i.e., providing DC-power having a DC-voltage amount falling within a mark-event-voltage interval, for an indefinite amount of time, as long as the connected DC-powered device draws a predetermined current amount, referred to as the mark-event current. Allowing this pause in a mark condition has benefits, including allowing the DC-power supply device to keep the DC-powered device in an off-mode (not in the first operating mode) but ready to start up immediately, since the detection and classification procedures inherent to the standard have already been realized and do not need to be performed again.

DC-powered devices of the second aspect are preferably configured to operate according to the IEEE 802.3 bt standard, but in addition also to use the extended mark period for driving the electrical load in operation according to the second operating mode, which typically involves less DC-power than the DC-power required for the first operating mode. These embodiments enable DC-Powered Devices (PDs) in a Power over Ethernet system, e.g. LED lighting fixtures to operate under a very low power standby mechanism by exploiting the extended mark period that 802.3bt compliant DC-power-supply devices (PSEs) are allowed to perform.

Preferably, the electrical load unit is configured to require not more and not less than the predetermined mark-event current amount for operating in the second operating mode. This ensures that the DC-power device stays in the mark event, i.e. delivers DC-power using the mark-event voltage. Preferably, the predetermined mark-event current amount is a mark event current interval of current values between 0.25 mA and 4 mA.

There are several embodiments implementing different ways for changing from the second operating mode to the first operating mode. In one embodiment the electrical load unit is configured to provide to the external DC-power supply device an operating-power request for changing from operation of the electrical load unit in the second operating mode to operating the electrical load unit in the first operating mode. This way, the DC-powered devices, while operating in the second operating mode, indicates to the DC-power supply device that it requires a particular operating power amount for operation in the first operating mode and thus triggers the change in operating mode.

In another of these embodiments the electrical load unit comprises an Ethernet transceiver configured to establish and maintain a communication link with the external DC-power supply device. The electrical load unit is configured to keep the Ethernet transceiver deactivated in the second operational mode and to indicate to the external DC-power supply device the operating-power request by preferably not more than activating the Ethernet transceiver and establishing a communication link with the external DC-power supply device. In alterative variants, which may be combined, either an internally generated signal, or an external signal or an external user input are usable to activate the Ethernet transceiver in order to establish a communication link with the DC-power supply device. A suitable DC-power supply device is turn configured to interpret the establishment of a communication link with the Ethernet transceiver as an operating power request. In response, this suitable DC-power supply stops providing a DC-power having a voltage amount falling into the mark-event-voltage interval and supply DC-power having a voltage amount falling into the operating-voltage interval. The DC-voltage monitoring unit then provides a response signal indicative thereof that is received by the control unit and trigger the delivery of the DC-power for the first operating mode.

In other embodiments of the DC-powered device, the electrical load unit comprises an Ethernet transceiver being operable in the second operating mode and configured to establish and maintain a communication link with the external DC-power supply device and to provide the operating-power request via the communication link in accordance with a link layer protocol. The link layer protocol suitably is the Link Layer Discovery Protocol (LLDP).

In yet other embodiments of the DC-powered device, the electrical load unit comprises a load control unit, which is configured to indicate to the external DC-power supply device the operating-power request by switching from the second operating mode to an operating-power-request mode in which the electrical load unit is configured to require—in a first variant—delivery of a current larger than the predetermined mark-event current amount, or—in a second variant—delivery of a current smaller than the predetermined mark-event current amount. Here, the load control unit can thus "intentionally" drive the electrical load unit into drawing a current amount that is either higher or lower than the predetermined mark-event current amount in order to trigger a change of the operating mode.

In preferred implementations of the mentioned first variant, the drawn current indicative of the operating power request is at least twenty-five times higher that the mark-event current amount. In embodiments wherein the admissible mark-event current amount is implemented in the form of a mark-event current interval with mark-event current amounts between 0.25 mA and 4 mA, the drawn current indicative of the operating power request is higher than 100 mA. A suitable DC-power supply device is configured to interpret the drawing of such a current as an operating power request.

In implementations of the second variant, the DC-powered device is configured to indicate the operating power request by drawing a current having a value lower than the mark-event current amount. In the variants of this kind the mark-event current amount is preferably a mark-event current interval with mark-event current amounts between 0.25 mA and 4 mA, the drawn current indicative of the operating power request is preferably less than 0.15 mA. A suitable DC-power supply device is configured to interpret the drawing of such a current as an operating power request.

As indicated before, the invention is particularly advantageous for use in the DC-powered devices wherein the electrical unit load comprises a lighting unit configured emit light when operating in the first operating mode.

According to a third aspect of the present invention, an electrical arrangement is provided. The electrical arrangement comprises a DC-power supply device configured to provide electrical DC-power of different power amounts, and at least one DC-powered device according to the second aspect and connected thereto via a wired power-supply line.

The electrical arrangement of the third aspect shares the advantages of the DC-powered device of the second aspect, and can be implemented using one or more DC-powered devices according to any of the embodiments of the DC-powered device of the second aspect. The DC-power supply device is preferably configured to operate using the extended mark period described above, and in particularly preferred embodiments is an 802.3bt compliant DC-power-supply device.

According to a fourth aspect of the present invention, a method for operating a DC-powered-device controller is provided. The method comprises:
receiving electrical DC-power of different power amounts from an external DC-power supply device;
monitoring a voltage amount of the received DC-power;
providing a respective response signal indicative of the currently received voltage amount falling into a respective one of a number of predetermined non-overlapping voltage intervals including a mark-event-voltage interval and an operating voltage interval, wherein voltage amounts of the mark-event voltage interval are lower than those of the operating-voltage interval;
starting a mark-event time measurement upon detecting that the currently received response signal indicates that the voltage amount of the currently received DC-power has made a transition into the mark-event voltage interval;
providing an extended-mark-time signal upon detecting that a measured mark-event time since the start of the mark-event time measurement exceeds a predetermined mark-event duration threshold; and
enabling delivery of the currently received DC-power to an external electrical load unit in event of either one of
a) detecting that the current response signal is indicative of the currently received voltage amount falling into the operating voltage interval, and
b) detecting that the extended-mark-time signal has been received.

The method of the fourth aspect shares the advantages of the DC-powered device of the second aspect, and can be implemented using additional features of any of the embodiments of the DC-powered device of the second aspect.

A fifth aspect is formed by a computer program comprising instructions configured to cause a DC-powered-device controller of the first aspect or any of its embodiments to execute the steps of the method of the fourth aspect.

A sixth aspect is formed by a computer-readable medium having stored thereon the computer program of the fifth aspect.

It shall thus be understood that the DC-powered-device controller of claim 1, the DC-powered device of claim 3, the electrical arrangement of claim 12, and the method for controlling operation of a DC-powered device of claim 13, the computer program of claim 14, and the computer-readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
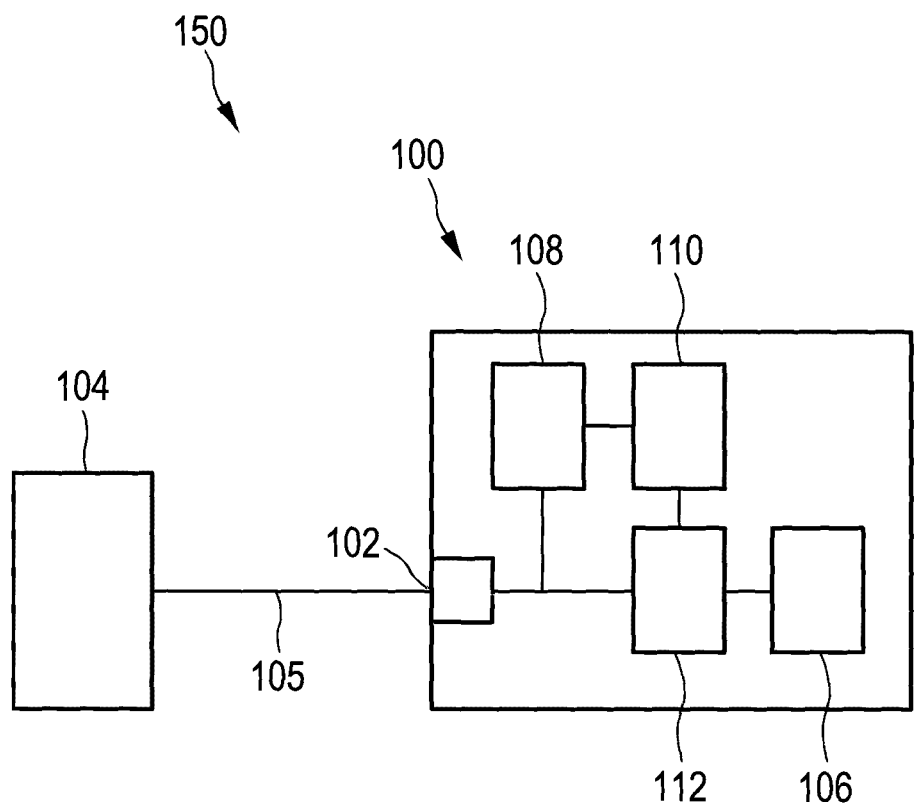
FIG. 1 shows a schematic block diagram of an embodiment of an electrical arrangement comprising a DC-power supply device connected via a wired power-supply line to a DC-powered device comprising a DC-powered device controller and an electrical load unit.

FIG. 1 shows a schematic block diagram of an embodiment of an electrical arrangement 150 comprising a DC-powered device 100 and a DC-power supply device 104, connected via a wired power-supply line 105. The DC-powered device comprises a DC-powered-device controller and an electrical load unit electrically connected thereto. The DC-power supply device is configured to provide electrical DC-power of different power amounts to the DC-powered device 100.

Figure 2A:
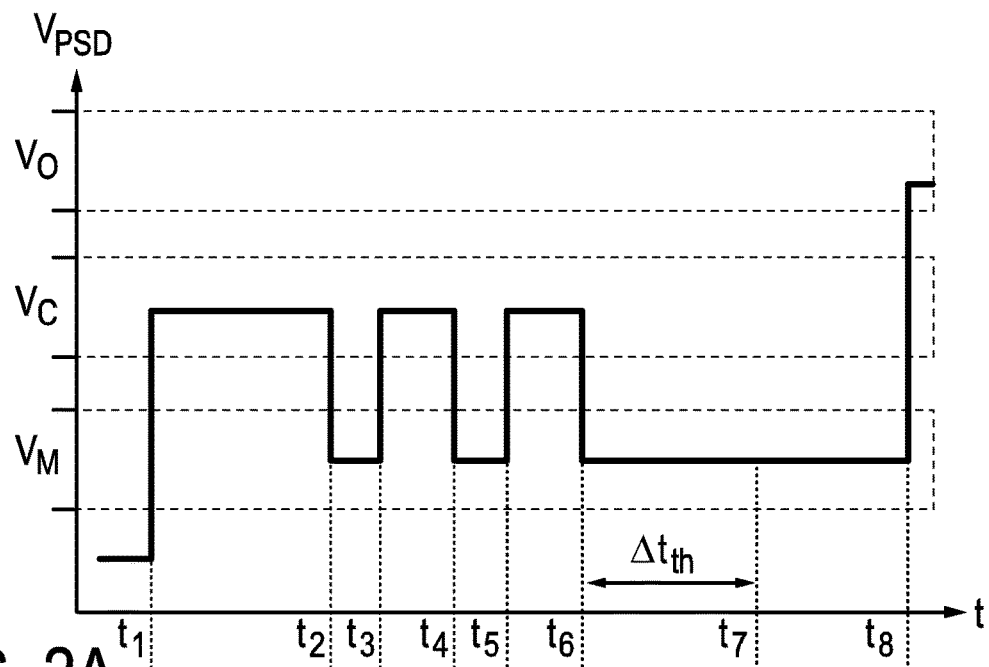
FIG. 2A shows a voltage-versus-time graph showing voltage amounts of the DC-power as a function of time.

The description of the functionality of the DC-powered device 100 will be made with further reference to FIG. 2A, which shows a voltage-versus-time graph showing voltage amounts of the DC-power as a function of time, as exemplary provided by the DC-powered supply device.

The DC-powered device comprises a DC-power unit 102 that is electrically connected to the DC-power supply device 104 via the wired power-supply line 105. The DC-powered device also comprises a DC-voltage monitoring unit 108 that is configured to monitor a current voltage amount $V_{PSD}$ of the received DC-power, and to output a respective response signal indicative of the currently received voltage amount falling into a respective one of a number of predetermined non-overlapping voltage intervals including a mark-event-voltage interval $V_M$ and an operating voltage interval $V_O$, as shown in FIG. 2. Voltage amounts of the mark-event voltage interval are lower than those of the operating-voltage interval.

The DC-powered device also comprises a mark-event timer unit 110 that is configured to receive the currently received response signal and to start a mark-event time measurement upon detecting that the currently received response signal indicates that the voltage amount of the currently received DC-power has made a transition into the mark-event voltage interval. It is also configured to provide an extended-mark-time signal upon detecting that a measured mark-event time since the start of the mark-event time measurement exceeds a predetermined mark-event duration threshold $\Delta t_{th}$.

This will be explained in detail with reference to the exemplary voltage signal $V_{PSD}$ of FIG. 2A. The DC-voltage monitoring units provides a response signal every time the currently received voltage amounts falls into any of the non-overlapping voltage intervals which, in this particular example are $V_M$, $V_C$ and $V_O$. It thus provides a response signal indicative of the currently received voltage falls into the mark-event voltage interval at times $t_2$, $t_4$ and $t_6$. The mark-event timer unit 110 starts a first mark-event time measurement at time $t_2$ that ends at $t_3$ when the currently received voltage amount leaves the mark-event-voltage interval $V_M$ and falls into a class-event voltage interval $V_C$, which is indicated by the DC-voltage monitoring unit by providing a response signal indicative thereof. The time span between $t_2$ and $t_3$ is shorter than the predetermined mark-event duration threshold $\Delta t_{th}$ so no extended-mark-time signal is provided by the mark-event timer unit. The mark-event timer unit 110 starts a second mark-event time measurement at a time $t_4$ that ends at $t_5$, again when the currently received voltage amount leaves the mark-event-voltage interval $V_M$. It then starts a third mark-event time measurement at time $t_6$. The currently received voltage amount stays within the mark-event voltage interval during a time span that is longer than the predetermined mark-event duration threshold $\Delta t_{th}$, so the mark-event timer unit provides an extended-mark-time signal at t7.

The DC-powered device 100 further comprises a control unit 112 that is connected with the DC-power unit and which is configured to receive the current response signal from the DC-voltage monitoring unit 108 and the extended-mark-time signal from the mark-event timer unit 110. The control unit is also configured to enable delivery of the currently received DC-power to an electrical load unit 106 in event of either one of:

a) detecting that the current response signal is indicative of the currently received voltage amount falling into the operating voltage interval $V_O$, and b) detecting that the extended-mark-time signal has been received.

In some DC-powered devices, the electrical load unit is configured to operate in a first operating mode upon delivery of the DC-power with a voltage amount falling in the operating voltage interval $V_O$, and to operate in a second operating mode requiring less DC-power than the first operating mode upon delivery of the DC power with a voltage amount falling in the mark-event voltage interval $V_M$. In these DC-powered devices the control unit is configured to enable the first operating mode upon detecting that the current response signal is indicative of the currently received voltage $V_{PSD}$ amount falling into the operating voltage interval $V_O$, and to enable the second operating mode upon detecting that the extended-mark-time signal has been received.

Figure 3:
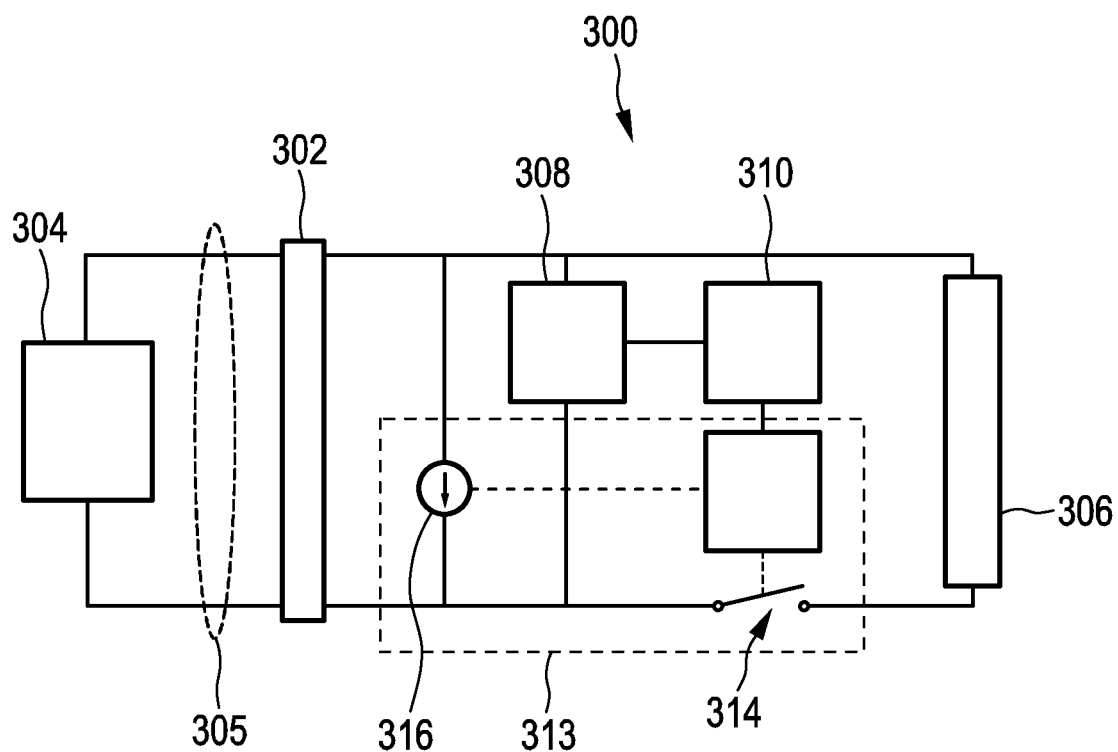
FIG. 3 shows a schematic block diagram of another electrical arrangement.

FIG. 3 shows a schematic block diagram of another embodiment of an electrical arrangement including a DC-powered device 300 connected to a DC-power source device 304. The following description of the DC-powered device 300 focuses on the technical features distinguishing the DC-powered device 300 from the DC-powered device 100 described with reference to FIG. 1. The features shared by the DC-powered devices 100 and 300 are referred to by using the same reference number, except for the first digit, that is "1" for the DC-powered device 100 and "3" for the DC-powered device 300. The control unit 313 of DC-powered device 300 is arranged between the DC-power unit 302 and the electrical load unit 306 and comprises a controllable hotswap switch 314 for enabling, in a closed state, or disabling, in an open state, the delivery of the currently received DC-power from the DC power unit 302 to the electrical load unit 306. It further comprises a controllable current source unit 316 arranged between the DC-power unit 302 and the hotswap switch 314 and configured to generate and provide electrical current of a controllable current amount to the external DC-power supply device 304.

Figure 2B:
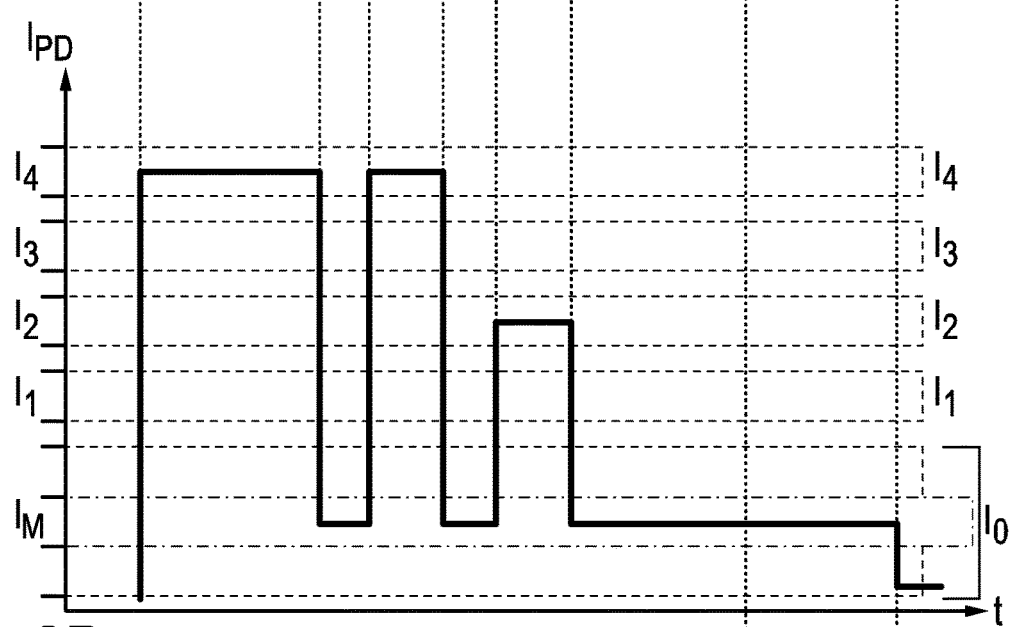
FIG. 2B shows a current-versus-time graph showing current amounts $I_{PD}$ drawn by a DC-powered device or generated by a controllable current source unit 316 in response to the currently received voltage amounts and depending on a stored device type identifier allocated to the DC-powered device.
Figure 2C:
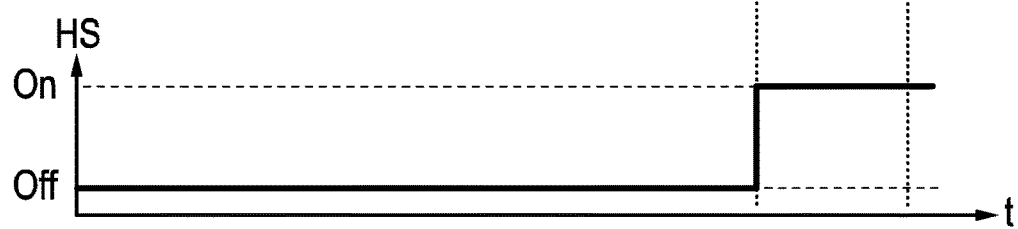
FIG. 2C shows the state of a hotswap switch in dependence on the voltage amount $V_{PSD}$.

The following description will be made with further reference to FIGS. 2A, 2B and 2C, wherein FIG. 2B, shows a current-versus-time graph showing current amounts $I_{PD}$ drawn by the DC-powered device or generated by the controllable current source unit 316 in response to the currently received voltage amount and depending on a stored device type identifier allocated to the DC-powered device 300, and FIG. 2C shows the state of a hotswap switch in dependence on the received voltage amount $V_{PSD}$ shown in FIG. 2A. All three graphs depicted in FIGS. 2 A-C share the same time axis.

In the DC-powered device 300, the DC-voltage monitoring unit 308 is configured to output the following response signals:
 a mark-event response signal indicative of the currently received voltage falling in the mark-event-voltage interval $V_M$.
 a class-event response signal indicative of the currently received voltage falling in a class-event voltage interval $V_C$, wherein voltage amounts of the class-event voltage interval are lower than those of the operating-voltage interval but higher than those of the mark-event voltage interval.

Also, control unit 313 is configured, while the controllable hotswap switch is in the open state, to count, with reference to a detected predetermined reset event, a number of received class-event response signals. A reset event can be triggered by the voltage amount falling into a predetermined reset-voltage interval which in some exemplary DC-powered devices is a non overlapping interval with voltage amounts lower than those of the mark-event-voltage interval. The control unit is further configured to control, in response to receiving a respective class-event response signal, the electrical current to be generated by the controllable current source to assume one of a number of predetermined class-current amounts in dependence on the momentaneous count of received class-event response signals and of a stored device type identifier allocated to the DC-powered device. It is also configured to control the amount of current generated by the controllable current source in response to a received mark-event response signal to assume a predetermined mark-event current amount.

Current amounts (both class-current amounts and mark-event current amount) are to be understood as a current amount falling within a predetermined current amount interval (i.e. a respective class-current amount interval and a mark-event current interval). Each one of the class-current amount intervals is non-overlapping, as shown in FIG. 2B.

These DC-powered devices are therefore advantageously configured to indicate its power requirements to a suitable DC-power supply device capable of providing different amounts of DC-power. The control unit 313 is configured to control the electrical current generated by the current source unit in dependence of the momentaneous count of received class-event response signals and of the stored device type identifier. The device identifier is indicative of the DC-power amount the DC-power device needs for its operation when the voltage amount of the DC-power falls within the operating voltage interval.

This will be further explained with respect to an exemplary DC-powered device which is configured to operate in accordance with the Power over Ethernet standard IEEE 802.3bt, although other communication standards are also applicable. The exemplary DC-powered device is connected to a DC-power supply device (a so-called Power Sourcing Equipment, PSE) via an Ethernet communication link comprising a wired power-supply line. The PSE is configured to provide one or more different amounts of DC-power depending on the capabilities of the PSE itself. The amount actually provided depends also on the device identifier of the DC-power device.

The DC-power supply device informs the DC-powered device of the power amount it can provide by means of class-event voltage pulses that the control unit 313 is configured to count based on the class-event response signals provided by the DC-voltage monitoring unit. Class-voltage pulses are voltage pulses having a voltage amount falling within the class-event voltage interval. Two class-voltage pulses are separated by the voltage amount $V_{PSD}$ falling, during a given time span, within the mark-event voltage interval. Therefore, in the case of the $V_{PSD}$ shown in FIG. 2A, there are three class-voltage pulses, namely between $t_1$ and $t_2$, between $t_3$ and $t_4$ and between $t_5$ and $t_6$. As shown in FIG. 2B, the control unit 313 of the DC-powered device 300 responds to each of these pulses with a respective electrical current to be generated by the controllable current source unit 316. The electrical current assumes one of a number of predetermined class-current amounts in dependence on the momentaneous count of received class-event response signals and of a stored device type identifier allocated to the DC-powered device.

In this particular example, the number of class-event voltage pulses provides the DC-powered device information about how much power the PSE is configured to deliver. This is summarized for a particular example in Table 1.

TABLE 1 number of class-event pulses the PSE is configured to send in dependence on the amounts of DC-power available.

| Number of class-event voltage pulses | Available DC-power amounts |
|---|---|
| 1 class-event voltage pulse | Up to 15 W |
| 2 class-event voltage pulses | Up to 30 W |
| 3 class-event voltage pulses | Up to 30 W |
| 4 class-event voltage pulses | Up to 60 W |
| 5 class-event voltage pulses | Up to 90 W |

As an example, table 2 shows a non-exhaustive overview of current amounts with respect to the number of class-event voltage pulses provided by a DC-power supply as a function of DC-power amount requested by the DC-powered device. The DC-power supply device is configured to provide up to 90 W and indicates it to the DC-powered device by providing up to 5 class-event voltages pulses.

TABLE 2 current amounts and number of class-event voltage pulses (CEVP) provided by a DC-power supply device as a function of DC-power amount requested by the DC-powered device.

| Current amount generated by current source unit for each class-event voltage pulse (CEVP) | | | | | DC-power requested by the DC-powered |
|---|---|---|---|---|---|
| CEVP1 | CEVP2 | CEVP3 | CEVP4 | CEVP5 | device |
| $I_0$ | $I_0$ | NA | NA | NA | 1.5 W |
| $I_1$ | $I_1$ | NA | NA | NA | 4 W |
| $I_2$ | $I_2$ | NA | NA | NA | 7 W |
| $I_3$ | $I_3$ | NA | NA | NA | 15 W |
| $I_4$ | $I_4$ | $I_4$ | NA | NA | 30 W |
| $I_4$ | $I_4$ | $I_0$ | $I_0$ | NA | 45 W |
| $I_4$ | $I_4$ | $I_1$ | $I_1$ | NA | 60 W |
| $I_4$ | $I_4$ | $I_2$ | $I_2$ | $I_2$ | 75 W |
| $I_4$ | $I_4$ | $I_3$ | $I_3$ | $I_3$ | 90 W |

In general, a DC-power supply device is configured not to produce more class-event pulses if the DC-power requested by the does not warrant it. For instance, a DC-power supply device capable of providing up to 90 W can output up to 5 class-event-voltage pulses. If, however, a DC-powered device is connected, that requires just 45 W for its first operating mode, the DC-power supply device will be aware of that after the third class-event-voltage pulse, since it has detected the following current amounts as a response to each class-event-voltage pulse: $I_4$, $I_4$, $I_0$. The DC-power supply device will provide a forth class-event-voltage pulse to indicate that is in indeed providing the 45 W to the DC-powered device, to which the DC-powered device will response with a current amount of $I_0$. The DC-power supply device will not provide a fifth class-event-voltage pulse (as indicated by NA in the corresponding column of table 2).

In turn, the DC-powered device informs the DC-power supply device of its power requirements by generating a respective current as a response to each of the counted class-event voltage pulses. In the example shown in FIGS. 2A, 2B and 2C, the control unit 313 controls the generation of a an electrical current having a class current amount falling within class-current amount interval $I_4$ during the first and second class-event voltage pulses and falling within class-current amount interval 12 during the third class-event voltage pulse. Additionally, at times in which the voltage amount $V_{PSD}$ falls within the mark-event voltage interval, the control unit 313 controls the current source unit, to generate a mark-event current amount that falls within a predetermined mark-event current interval $I_M$.

When the control unit 313 detects that the extended-mark-time signal has been received it switches the state the hotswap switch HS, which is in an open state, "Off" in FIG. 2C, to a close state, "On" in FIG. 2C, enabling delivery of the currently received DC-power to an electrical load unit. The currently received DC-power has in this case a voltage amount falling within the mark-event voltage range, which is lower than voltages amounts falling within the operation-voltage range. Advantageous DC-powered devices include electrical load units that are configured to require not more and not less than the predetermined mark-event current amount for operating in the second operating mode. These DC-powered devices will draw a current amount falling within the mark-event current amount during operation in the second operating mode. The PSE will sense no change in the drawn current and will continue to provide the $V_{PSD}$ having a voltage amount falling within the mark-event voltage interval, which will be used by the DC-powered device to power the electrical load unit 316 in the second operating mode.

Some DC-powered devices include a respective electrical load unit that is configured to indicate to the external DC-power supply device an operating-power request for changing from operation of the electrical load unit in the second operating mode to operating the electrical load unit in the first operating mode. Different electrical load units are configured to indicate the operating-power request in different manners.

Figure 4:
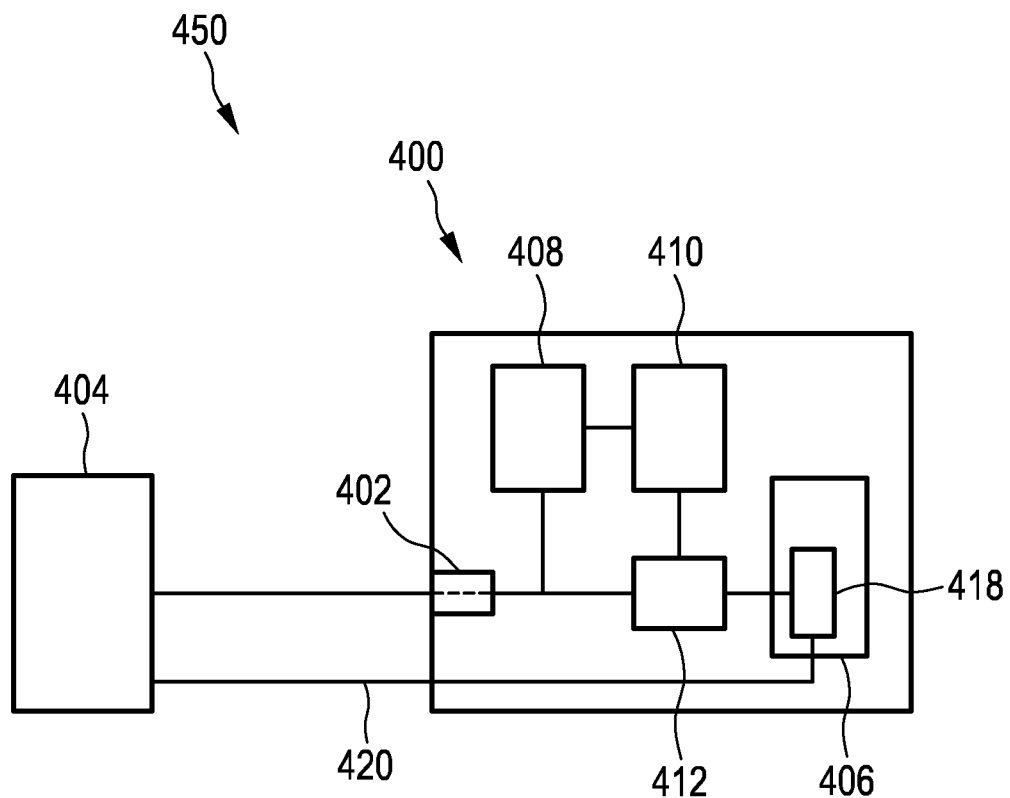
FIG. 4 shows a schematic block diagram of another electrical arrangement.

FIG. 4 shows a block diagram of an electrical arrangement 450 including a DC-powered device 400 and a DC-power supply device 404 connected via a wired power line 405. The description of FIG. 4 will focus on the differences between the DC-powered device 400 and DC-powered devices 100 and 300 described with reference to FIGS. 1 and 3 respectively. Features shared by DC-powered devices 100, 300 and 400 are referred to by reference numbers that differ only in the first digit, which is 1 for DC-powered device 100, 3 for DC-powered device 300 and 4 for DC-powered device 400. DC-powered device 400 includes an electrical load unit 406 which comprises an Ethernet transceiver 418 configured to establish and maintain a communication link 420 with an external DC-power supply device 404. The electrical load unit 406 is configured to keep the Ethernet transceiver deactivated in the second operational mode and to indicate to the external DC-power supply device the operating-power request by activating the Ethernet transceiver and establishing a communication link with the external DC-power supply device 404. A suitable DC-power supply device interprets the activation of the Ethernet transceiver as an operating-power request for changing from operation of the electrical load unit in the second operating mode to operating the electrical load unit in the first operating mode.

Other DC-powered devices include Ethernet transceivers that are operable in the second operating mode (i.e. provide a given functionality when operated in the second operating mode) and that are configured to establish and maintain a communication link with the external DC-power supply device. These Ethernet transceivers can be advantageously configured to provide the operating-power request via the communication link in accordance with a link layer protocol. For instance, the Ethernet may transmit a data frame according to a Link Layer Discovery Protocol (LLDP) that is interpreted by a suitable DC-power source device as the operating-power request.

Figure 5:
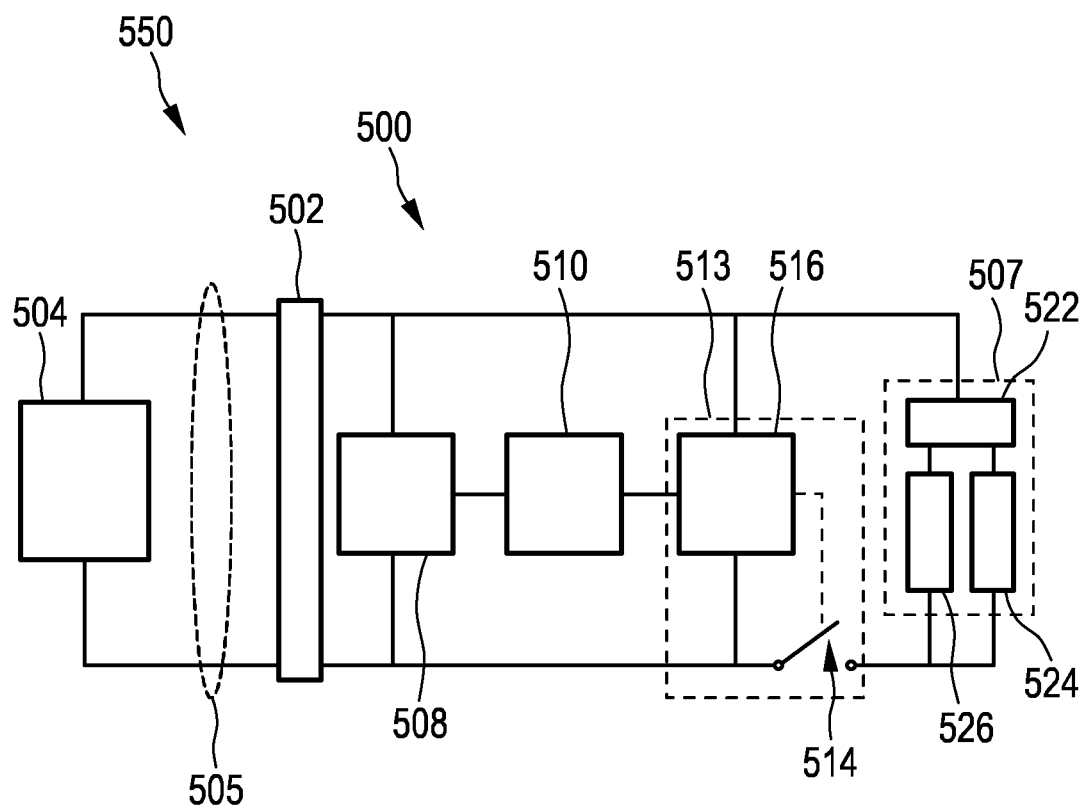
FIG. 5 shows a schematic block diagram of another electrical arrangement.

FIG. 5 shows a block diagram of another electrical arrangement 550 comprising a DC-powered device 500 connected to a DC-power supply device 504 via a wired power line 505. The description of FIG. 5 will focus on the differences between the DC-powered device 500 and DC-powered devices 100, 300 and 400 described with reference to FIGS. 1, 3 and 4 respectively. Features shared by DC-powered devices 100, 300, 400 and 500 are referred to by reference numbers that differ only in the first digit, which is 1 for DC-powered device 100, 3 for DC-powered device 300, 4 for DC-powered device 400 and 5 for DC-powered device 500. DC-powered device 500 includes an electrical load unit 516 that comprises a load control unit 522. The load control unit 522 is advantageously configured to indicate to the external DC-power supply device 504 the operating-power request by switching from the second operating mode to an operating-power-request mode in which the electrical load unit is configured to require either more or less than the predetermined mark-event current amount.

For instance, electrical load unit 507 comprises two load devices 524 and 526. During operation in the second operation mode, the control unit 513 enables the delivery of DC-power from the DC-power supply source to the electrical load unit by switching the hotswap switch to a closed state. The DC-power delivery has a voltage amount falling within the mark-event voltage interval. The load control unit connects load device 524, which then operates in the second operation mode. Load device 524 is configured to request a current amount that falls within a predetermined mark-event current amount. In order to request operating power to the DC-power supply device the load control switches the delivery of DC-power from load device 524 to load device 526. Load device 526 is configured in some DC-powered devices to require more current than the predetermined mark-event current amount. Alternatively, other load devices are configured in some DC-powered devices to require less current than the predetermined mark-event current amount.

This is further explained with reference to FIGS. 2A and 2B. The control unit 513 switches hotswap switch 514 to a closed state upon receiving the extended-mark-time signal at $t_7$, thus enabling delivery of DC-power from the external DC-power supply 504 to the electrical load unit 507. The DC-power provided allows for a second operation mode of the electrical load unit, which in this case corresponds to a functionality given by load device 524. Load control unit transfers the delivery of DC-power to the load device 524 which is configured to draw a current amount falling within the mark-event current interval $I_M$. For requesting operating-power to the DC-power device, which can be due to an external signal (e.g. a user activating a switch, a sensor providing a trigger signal, etc.) the load control unit switches power delivery to unit load 526 which, in this particular example is configured to request less current amount than the mark-event current amount (i.e. a current amount falling within a power-request current interval non overlapping with and having lower current values than those of the mark-event current interval $I_M$). According to FIG. 2B, such an operating power request is provided at time t8. The load control unit switches the transfer of power to load device 526, which requires a current amount lower than IM. The suitably configured external DC-power supply device 504 detects that the momentaneous current amount drawn by the DC-powered device 500 is lower than $I_M$ and is configured to interpret it as an operating power request.

Figure 6:
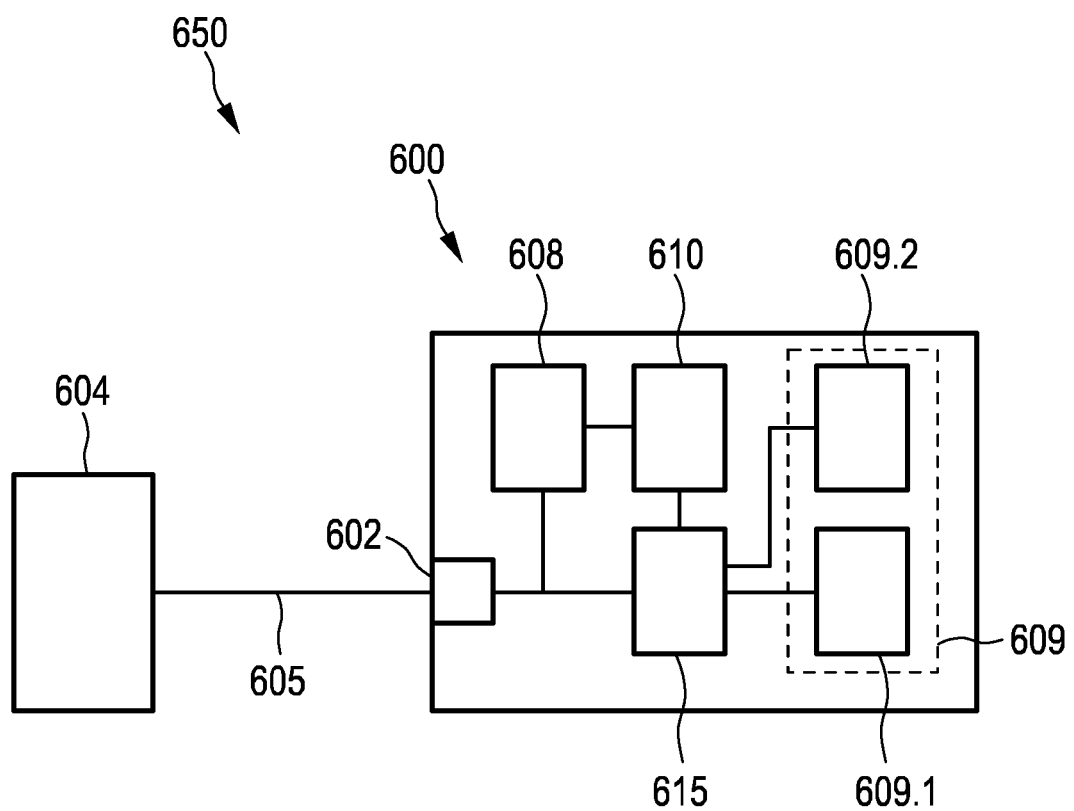
FIG. 6 shows a schematic block diagram of another electrical arrangement.

FIG. 6 shows a schematic block diagram of another embodiment of an electrical arrangement 650 comprising a DC-power supply device 604 and a DC-powered device 600. The features shared by DC-powered device 100 and DC-powered device 600 are referred to by reference numbers that differ only in the first digit, which is 1 for DC-powered device 100 and 6 for DC-powered device 600. DC-powered device 600 comprises an electrical load unit 609 that includes two load devices 609.1 and 609.2. Load device 609.1 is a lighting unit configured emit light when operating in the first operating mode. Additionally, load unit 609 comprises a second load device 609.2 which is operable under the second operating mode requiring less amount of DC-power to perform its operation than the lighting unit 609.1. In the exemplary case of an electrical arrangement configured to operate in accordance with the Power over Ethernet standard IEEE 802.3bt, the DC-power supply device 604 is configured to perform a detection phase to detect if DC-powered device 600 is connected via the wired power line 605, and upon detecting that DC-powered device is connected, to perform a classification phase with the aim to exchange information about the DC-power that the DC-power supply is configured to provide and the DC-power that the DC-powered device requires for operating the first operation mode. At the end of this classification phase, and according to the IEE 802.3bt standard, the DC-power supply device is configured to provide DC-power having a voltage amount falling into the mark-event-voltage interval. If this voltage is provided during a time span longer than the predetermined mark-event duration threshold, the mark-event timer unit 610 will provide an extended-mark-time signal that will cause the control unit 615 to enable power delivery to the load device 609.2.

The predetermined mark-event duration threshold preferably amounts to at least 400 milliseconds.

The load device 609.2 can for instance be a sensor configured to control a transition from the second to the first operation mode. As an example, the load device 609.2 can be a movement sensor (e.g. an infrared sensor). Upon detecting movement of an object within its range, the movement sensor is configured to provide an operating-power request for changing from operation of the electrical load unit in the second operating mode to operating the electrical load unit in the first operating mode. The DC-power supply device received the operating-power request and provides a DC-power amount as required by the first operation mode and as determined during the classification phase.

Figure 7:
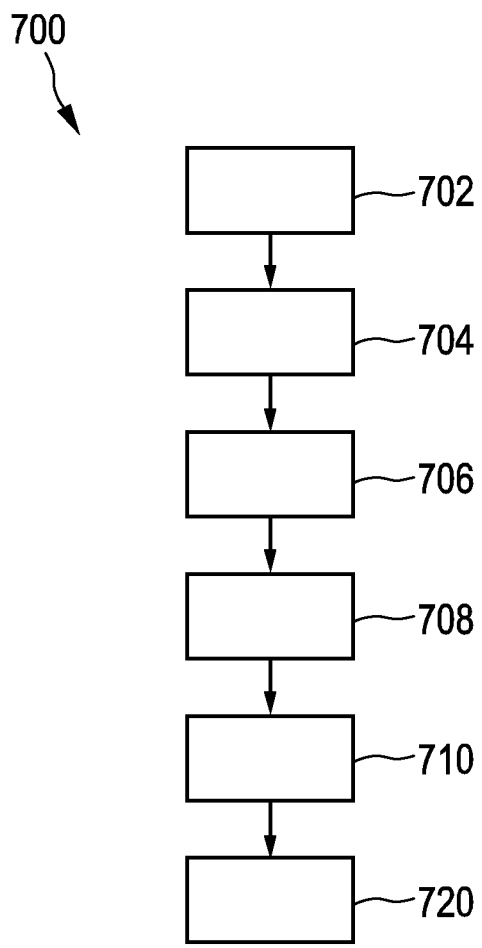
FIG. 7 shows a flow diagram of an embodiment of a method for operating a DC-powered device.

FIG. 7 shows a flow diagram of an embodiment of a method 700 for operating a DC-powered device. The method 700 comprises a step 702 in which electrical DC-power of different power amounts is received from an external DC-power supply device. The method also includes a step 704 in which a voltage amount of the received DC-power is monitored. The method further comprises a step in which a respective response signal indicative of the currently received voltage amount falling into a respective one of a number of predetermined non-overlapping voltage intervals is received. The intervals include a mark-event-voltage interval and an operating voltage interval, wherein voltage amounts of the mark-event voltage interval are lower than those of the operating-voltage interval. The method also comprises a step 708 in which a mark-event time measurement is started upon detecting that the currently received response signal indicates that the voltage amount of the currently received DC-power has made a transition into the mark-event voltage interval. The method further comprises a step 710 in which an extended-mark-time signal is provided upon detecting that a measured mark-event time since the start of the mark-event time measurement exceeds a predetermined mark-event duration threshold. Finally, the method includes a step 712 in which delivery of the currently received DC-power to an electrical load unit is enables in event of either one of a) detecting that the current response signal is indicative of the currently received voltage amount falling into the operating voltage interval, and b) detecting that the extended-mark-time signal has been received.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The combination of elements by the word "or" does not exclude an element but clarifies that every combination of the combined elements is possible.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A power controller for a DC-powered device, hereinafter DC-powered-device controller, comprising:

a DC-power unit configured to be electrically connected to an external DC-power supply device and to receive electrical DC-power of different power amounts therefrom;

a DC-voltage monitoring unit configured to monitor a currently received voltage amount of the received DC-power, and to output a respective response signal indicative of the currently received voltage amount falling into a respective one of a number of predetermined non-overlapping voltage intervals including a mark-event-voltage interval and an operating voltage interval, wherein voltage amounts of the mark-event voltage interval are lower than those of the operating-voltage interval;

a mark-event timer unit configured to receive the currently received response signal and to start a mark-event time measurement upon detecting that the currently received response signal indicates that the voltage amount of the currently received DC-power has made a transition into the mark-event voltage interval, and to provide an extended-mark-time signal upon detecting that a measured mark-event time since the start of the mark-event time measurement exceeds a predetermined mark-event duration threshold;

a control unit connected with the DC-power unit and configured to receive the current response signal and the extended-mark-time signal, and configured to enable delivery of the currently received DC-power to an external electrical load unit in event of either one of:

a) detecting that the current response signal is indicative of the currently received voltage amount falling into the operating voltage interval, and b) detecting that the extended-mark-time signal has been received.

2. The DC-powered-device controller of claim 1, wherein the predetermined mark-event duration threshold amounts to at least 400 milliseconds.

3. A DC-powered device comprising:

a DC-powered-device controller according to claim 1; and an electrical load unit configured to operate in a first operating mode upon delivery of the DC-power with a voltage amount falling in the operating voltage interval, and to operate in a second operating mode requiring less DC-power than the first operating mode upon delivery of the DC power with a voltage amount falling in the mark-event voltage interval; wherein the control unit of the DC-powered-device controller is configured to enable the first operating mode upon detecting that the current response signal is indicative of the currently received voltage amount falling into the operating voltage interval, and to enable the second operating mode upon detecting that the extended-mark-time signal has been received.

4. The DC-powered device of claim 3, wherein the control unit is arranged between the DC-power unit and the electrical load unit and comprises a controllable hotswap switch for enabling, in a closed state, or disabling, in an open state, the delivery of the currently received DC-power from the DC power unit to the electrical load unit;

a controllable current source unit arranged between the DC-power unit and the hotswap switch and configured to generate and provide electrical current of a controllable current amount to the external DC-power supply device; wherein the DC-voltage monitoring unit is configured to output the following response signals:

a mark-event response signal indicative of the currently received voltage falling in the mark-event-voltage interval, a class-event response signal indicative of the currently received voltage falling in a class-event voltage interval, wherein voltage amounts of the class-event voltage interval are lower than those of the operating-voltage interval but higher than those of the mark-event voltage interval; and the control unit is configured, while the controllable hotswap switch is in the open state, to count, with reference to a detected predetermined reset event, a number of received class-event response signals, and to control, in response to receiving a respective class-event response signal, the electrical current to be generated by the controllable current source unit to assume one of a number of predetermined class-current amounts in dependence on the momentaneous count of received class-event response signals and of a stored device type identifier allocated to the DC-powered device; and to control the amount of current generated by the controllable current source in response to a received mark-event response signal to assume a predetermined mark-event current amount.

5. The DC-powered device of claim 4, wherein the electrical load unit is configured to require not more and not less than the predetermined mark-event current amount for operating in the second operating mode.

6. The DC-powered device of claim 5, wherein the electrical load unit is configured to indicate to the external DC-power supply device an operating-power request for changing from operation of the electrical load unit in the second operating mode to operating the electrical load unit in the first operating mode.

7. The DC-powered device of claim 5, wherein the electrical load unit comprises an Ethernet transceiver configured to establish and maintain a communication link with the external DC-power supply device, and wherein the electrical load unit is configured to keep the Ethernet transceiver deactivated in the second operational mode and to indicate to the external DC-power supply device the operating-power request by activating the Ethernet transceiver and establishing a communication link with the external DC-power supply device.

8. The DC-powered device of claim 5, wherein the electrical load unit comprises an Ethernet transceiver being operable in the second operating mode and configured to establish and maintain a communication link with the external DC-power supply device and to provide the operating-power request via the communication link in accordance with a link layer protocol.

9. The DC-powered device of claim 5, wherein the electrical load unit comprises a load control unit, which is configured to indicate to the external DC-power supply device the operating-power request by switching from the second operating mode to an operating-power-request mode in which the electrical load unit is configured to require either more or less than the predetermined mark-event current amount.

10. The DC-powered device according to claim 3, wherein the electrical unit load comprises a lighting unit configured emit light when operating in the first operating mode.

11. The DC-powered device according to claim 3, which is configured to operate in accordance with the Power over Ethernet standard IEEE 802.3bt.

12. An electrical arrangement comprising a DC-power supply device configured to provide electrical DC-power of different power amounts, and a DC-powered device according to claim 3 connected thereto via a wired power-supply line.

13. A method for operating a DC-powered-device controller, the method comprising:
  receiving electrical DC-power of different power amounts from an external DC-power supply device;
  monitoring a voltage amount of the received DC-power;
  providing a respective response signal indicative of the currently received voltage amount falling into a respective one of a number of predetermined non-overlapping voltage intervals including a mark-event-voltage interval and an operating voltage interval, wherein voltage amounts of the mark-event voltage interval are lower than those of the operating-voltage interval;
  starting a mark-event time measurement upon detecting that the currently received response signal indicates that the voltage amount of the currently received DC-power has made a transition into the mark-event voltage interval;
  providing an extended-mark-time signal upon detecting that a measured mark-event time since the start of the mark-event time measurement exceeds a predetermined mark-event duration threshold; and
  enabling delivery of the currently received DC-power to an external electrical load unit in event of either one of
    a) detecting that the current response signal is indicative of the currently received voltage amount falling into the operating voltage interval, and
    b) detecting that the extended-mark-time signal has been received.

14. A non-transitory computer-readable medium having stored thereon a computer program comprising instructions configured to operate the DC powered device controller of claim 1.

* * * * *